United States Patent [19]

Basista et al.

[11] 4,451,124

[45] May 29, 1984

[54] PHOTOGRAPHIC LENS OF CONTINUOUSLY VARIABLE FOCAL LENGTH

[75] Inventors: Heinrich Basista, Königsbronn; Erhard Glatzel, Heidenheim, both of Fed. Rep. of Germany

[73] Assignee: Carl-Zeiss-Stiftung, Heidenheim/Brenz, Fed. Rep. of Germany

[21] Appl. No.: 422,341

[22] Filed: Sep. 23, 1982

[30] Foreign Application Priority Data

Oct. 10, 1981 [DE] Fed. Rep. of Germany ....... 3140378

[51] Int. Cl.$^3$ .......................... G02B 7/04; G02B 15/00
[52] U.S. Cl. ..................................... 350/427; 350/423
[58] Field of Search ............... 350/423, 427, 450, 469, 350/449

[56] References Cited

U.S. PATENT DOCUMENTS 3,584,935 6/1971 Kojima ................................. 350/427
3,658,411 4/1972 Price ................................... 350/427
4,270,848 6/1981 Angenieux ........................ 350/427

*Primary Examiner*—John K. Corbin
*Assistant Examiner*—Paul M. Dzierzynski
*Attorney, Agent, or Firm*—Stonebraker, Shepard & Stephens

[57] ABSTRACT

A photographic lens of continuously variable focal length (i.e., a zoom lens) consisting of four lens groups designated from front to rear as groups A, B, C, and D. Group B has diverging refractive power; the other three have converging power. An iris diaphragm is located between groups B and C. Group C has a focal length which is numerically greater (disregarding difference in sign) than the focal length of group B by a factor not less than 1.42 and not more than 1.73. Lens group D is formed of two parts $D_1$ and $D_2$, separated from each other by a clear air space. The first part $D_1$ has negative power; the second part $D_2$ has positive power. The focal length of the part $D_1$ is numerically greater (disregarding the difference in sign) than the focal length of group C by a factor not less than 1.16 and not more than 1.42.

2 Claims, 2 Drawing Figures

PHOTOGRAPHIC LENS OF CONTINUOUSLY VARIABLE FOCAL LENGTH

BACKGROUND OF THE INVENTION

The invention relates to photographic lenses or objectives of continuously variable focal length, that is, objectives whose focal length may be varied or adjusted to any desired value within the limits or range for which the objective is designed. Such lenses, sometimes called zoom lenses, are well known in general. On example of a lens of this general type is disclosed in Basista U.S. Pat. No. 4,303,312, granted Dec. 1, 1981. Another example, which has been available on the market under the trademark "Vario-Sonar," is disclosed in German Federal Republic patent No. 1,254,477, issued May 9, 1968, and in the corresponding British Pat. No. 1,167,114, published Oct. 15, 1969.

The "Vario-Sonar" lens as disclosed in these mentioned patents and as available on the market has a relative aperture of f:2.8, and a focal length variable within the limits of 10 mm. to 100 mm. The imagining performance and the external dimensions of this known lens are excellent, and its glass weight of 264.8 grams also fully satisfies the requirements. However, it is no longer competitive today because of its relative aperture of f:2.8, the current demand being for faster lenses of larger aperture. In these known lenses, the iris diaphragm is arranged in the base lens.

SUMMARY OF THE INVENTION

The object of the present invention is therefore to provide an optical system of new design which still satisfies the previously satisfied requirements in the field of use of the previously known lens, namely, good coverage for a format of 7.5×10.36 mm. (the picture size when using 16 mm. film), but which has a significantly larger aperture than the above-mentioned f:2.8.

The preferred form of lens of the present invention consists of four lens groups. The first group (A) is of converging refractive power. The second group (B) is of diverging refractive power. The third group (C) is of converging refractive power, and the fourth group (D) is also of converging refractive power. The change in the focal length of the lens system is effected, while maintaining its back focus constant, by displacing or shifting, along the optical axis, the diverging lens group B and the converging lens group C relative to each other and relative to the other two (first and last) converging lens groups A and D.

In such a lens, the above mentioned object is achieved in accordance with the invention by providing an optical system which is characterized, as compared with the prior art, by the following features:

(1) The iris diaphragm is arranged between the two displaceable lens groups B and C.

(2) The focal length of the third lens group C is larger than that of the second group B, and is at least 1.42 times and not more than 1.73 times the focal length of the second lens group B.

(3) The fourth lens group D is formed of two parts or sub-groups separated by a clear air space, the first part being of negative powder and the second part of positive power.

(4) The first part or sub-group $D_1$ of the fourth lens group consists of a compound member which is formed of at least two lenses and which has a focal length which is greater than that of the third lens group C by at least 1.16 times the focal length and not more than 1.42 times the focal length of the third lens group C.

When the above listed characteristics or features are considered as rules to be followed in designing the lens system, some variations from the specific example disclosed below are possible, as mentioned hereafter.

The advantages obtained by the invention include, in particular, the fact that the objective can have a fairly large relative aperture of f:1.8, yet with a rather small front lens diameter, and a large range of extension or focal length variation is obtained from about 10 mm. to 100 mm. The diagonal of the picture format (about 12.7 mm.) is greater than the shortest focal length (10 mm.) of the lens system, which is equivalent to penetration into the wide-angle range.

DESCRIPTION OF THE PREFERRED EMBODIMENT

Figure 1:
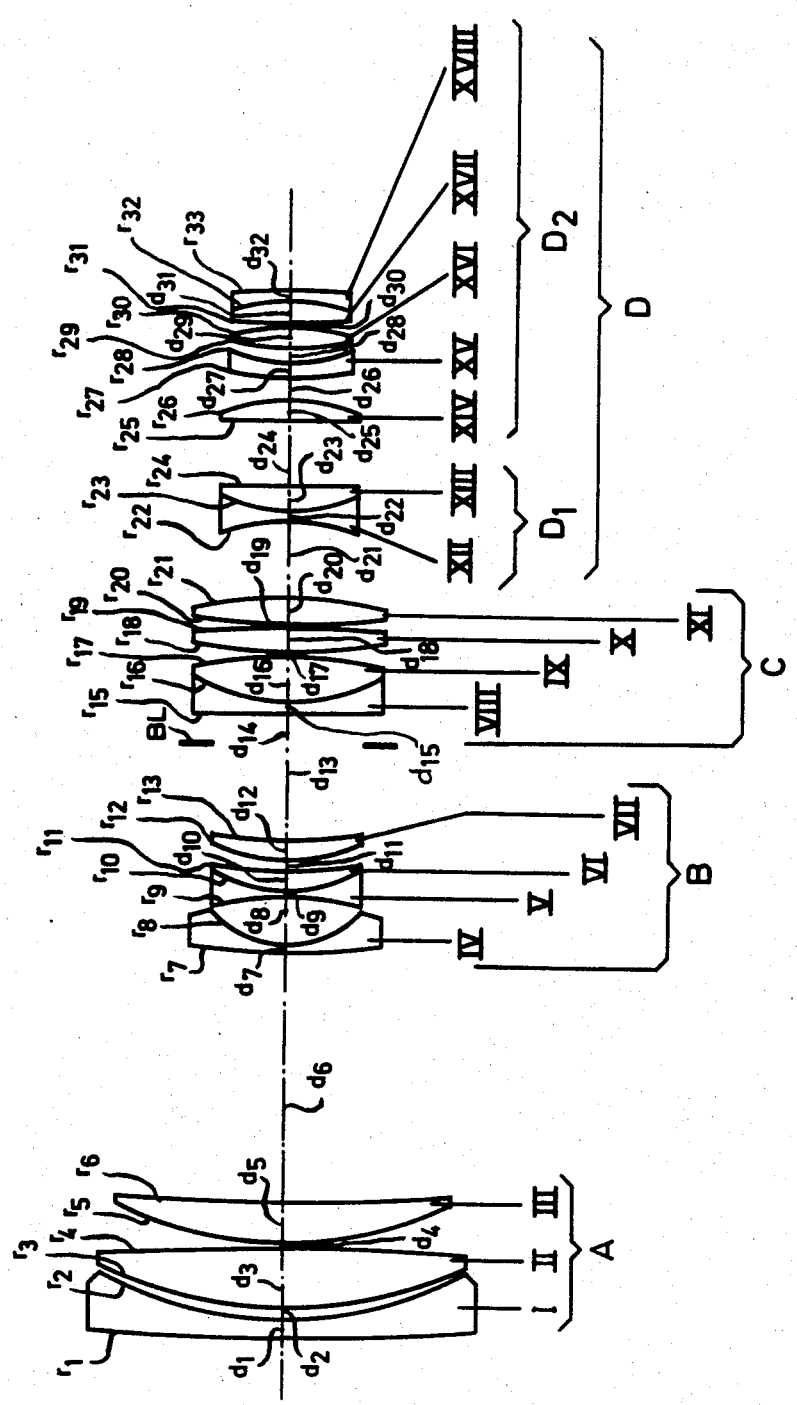
FIG. 1 is a schematic sectional view, taken along the optical axis, of a lens according to a preferred embodiment of the invention.

Numerical data for a preferred embodiment of the invention are given in Table 1, and such a lens system is illustrated schematically in FIG. 1, where the adjustable members are shown approximately in the relative positions they occupy when the objective is adjusted to a focal length of 49.855 mm. and is focussed at infinity.

In FIG. 1, the front of the lens is at the left. Light from the object being photographed passes through the lens from left to right, and forms an image at the image plane (not shown) to the right of the rearmost lens element.

Both in the table and in the illustration, the individual lens elements are numbered from front to rear in a consecutive series of Roman numerals from I to XVIII. The division of the elements into the four main groups A, B, C, and D previously mentioned, as well as the two sub-groups $D_1$ and $D_2$, is shown in FIG. 1, and will be apparent in Table 1 although not specifically stated there.

Also, both in the illustration and in the table, the vertex or axial thicknesses of the respective elements and spaces between elements are designated by the letter d with a numerical subscript corresponding to the particular thickness or space as numbered from front to rear in a single consecutive series from 1 to 32. Similarly, radii of curvature of the respective lens elements are designated by the letter r with a numerical subscript identifying the particular surface as numbered consecutively from front to rear, from 1 to 33. The distances and thicknesses d and the radii r are given in the table in millimeters. As is conventional, positive radii represent surfaces convex toward the front and concave toward the rear, and negative radii represent surfaces concave toward the front and convex toward the rear. For cemented surfaces, only a single r number is given, since the rear face of the front element of a doublet has the same curvature as the front face of the rear element, and no d number is assigned for space between the two cemented elements, since there is no such space.

The refractive index, with reference to the d line, of the glass used for each element is given in the column headed $n_d$. The Abbe number of each glass, also with reference to the d line, is given in the column headed $V_d$.

TABLE 1

| Lens element | Radii | | Thicknesses and Spacings | $n_d$ | $V_d$ |
|---|---|---|---|---|---|
| I | $r_1$ + 421.790 | $d_1$ | 3.0 | 1.75520 | 27.58 |
| | $r_2$ + 64.470 | $d_2$ | 1.8 | | |
| II | $r_3$ + 69.282 | $d_3$ | 10.5 | 1.69100 | 54.71 |
| | $r_4$ − 453.140 | $d_4$ | 0.1 | | |
| III | $r_5$ + 64.470 | $d_5$ | 7.0 | 1.69100 | 54.71 |
| | $r_6$ + 339.850 | $d_6$ | (0.5) | | |
| | | | (40.523) | | |
| | | | (53.897) | | |
| IV | $r_7$ + 113.824 | $d_7$ | 1.2 | 1.71300 | 53.83 |
| | $r_8$ + 17.278 | $d_8$ | 8.0 | 1.71300 | 53.83 |
| V | $r_9$ − 48.000 | $d_9$ | 1.0 | | |
| VI | $r_{10}$ + 25.664 | $d_{10}$ | 3.2 | 1.75520 | 27.58 |
| | $r_{11}$ + 69.282 | $d_{11}$ | 2.0 | | |
| VII | $r_{12}$ + 37.585 | $d_{12}$ | 3.0 | 1.75520 | 27.58 |
| | $r_{13}$ + 79.431 | $d_{13}$ | (55.797) | | |
| | | | (15.774) | | |
| | | | (2.400) | | |
| BL | $r_{14}$ ∝ | iris diaphragm | | | |
| | | $d_{14}$ | (15.245) | | |
| | | | (4.749) | | |
| | | | (4.829) | | |
| VIII | $r_{15}$ + 1122.000 | $d_{15}$ | 2.0 | 1.805518 | 25.43 |
| IX | $r_{16}$ + 32.545 | $d_{16}$ | 8.0 | 1.61272 | 58.63 |
| | $r_{17}$ − 57.460 | $d_{17}$ | 0.1 | | |
| X | $r_{18}$ + 99.283 | $d_{18}$ | 4.2 | 1.71300 | 53.83 |
| | $r_{19}$ − 172.776 | $d_{19}$ | 0.1 | | |
| XI | $r_{20}$ + 127.721 | $d_{20}$ | 4.4 | 1.71300 | 53.83 |
| | $r_{21}$ − 68.293 | $d_{21}$ | (2.528) | | |
| | | | (13.024) | | |
| | | | (12.944) | | |
| XII | $r_{22}$ − 29.853 | $d_{22}$ | 1.0 | 1.71300 | 53.83 |
| XIII | $r_{23}$ + 20.834 | $d_{23}$ | 4.5 | 1.76180 | 26.95 |
| | $r_{24}$ + 227.110 | $d_{24}$ | 10.7 | | |
| XIV | $r_{25}$ − 1729.000 | $d_{25}$ | 3.2 | 1.69100 | 54.71 |
| | $r_{26}$ − 35.737 | $d_{26}$ | 4.1 | | |
| XV | $r_{27}$ + 112.204 | $d_{27}$ | 2.2 | 1.80518 | 25.43 |
| | $r_{28}$ + 32.315 | $d_{28}$ | 2.7 | | |
| XVI | $r_{29}$ + 82.939 | $d_{29}$ | 3.3 | 1.46450 | 65.77 |
| | $r_{30}$ − 35.228 | $d_{30}$ | 0.1 | | |
| XVII | $r_{31}$ + 97.166 | $d_{31}$ | 4.1 | 1.60311 | 60.60 |
| XVIII | $r_{32}$ − 22.386 | $d_{32}$ | 1.5 | 1.80518 | 25.43 |
| | $r_{33}$ − 92.387 | | | | |
| Back focus $s'$ = 28.53 | | | | | |

The first converging lens group A consists of three members (I, II, and III), of which lens I is a diverging meniscus which is curved toward the image side. Displacement of the lens group A by 7.243 mm. in the direction toward the object results in close-up focusing from infinity to 1.5 meters.

The diverging second lens group B consists of at least three members. Of these, the member facing the converging third lens group C is a converging member which is of concave curvature toward the image side. In the preferred form as illustrated in the drawing and specified in the table, this second group B has four elements, two of which (V and VI) are cemented together.

The converging third lens group C consists of at least three members, at least one of which has a diverging cemented surface which is curved concave toward the image side. As will be seen from the table and the drawing, this cemented surface, in the exemplary embodiment, is between elements VIII and IX.

The refractive power of this third lens group C is so dimensioned, in accordance with one of the features of the invention, that its focal length is larger in numerical amount (disregarding difference in sign) than that of the second group B, by a factor of not less than 1.42 times and not more than 1.73 times the focal length of the second lens group B. Displacement of the lens group C from the wide-angle position by 2.736 mm. in the direction toward the object permits an additional extreme close-up focusing of up to 0.204 meter measured from the film plane. The image scale, in this focus position, is −0.25, and the distance of the object from the first lens vertex is 4.6 mm.

The converging fourth lens group D is a multi-lens group and is formed predominantly of two parts $D_1$ and $D_2$. The first part $D_1$ follows directly after the third lens group C and has a negative refractive power. It consists of at least two lenses, preferably a compound member. The focal length of this part $D_1$ is greater in numerical amount (disregarding difference in sign) by a factor of not less than 1.16 and not more than 1.42 times that of the third converging lens group C.

The second part $D_2$ of the fourth group D has a converging refractive power and follows the first part $D_1$ after a clear air space. Displacement of the second part $D_2$ into this air space can also be used for extreme close-up focusing up to an object position directly in front of the first lens vertex.

A flexible iris diaphragm, schematically shown at BL in FIG. 1, is arranged in the second variable air space, i.e., the space between group B and group C. The diaphragm preferably maintains the same distance from the image plane in all focal length positions. In the case of known zoom lenses, the iris diaphragm is located in the fourth lens group D. The placing of the iris diaphragm further toward the front of the lens system is one of the important characteristics of the invention. It permits smaller front-lens diameters with the adaptation, in accordance with the invention, of the four lens groups (A to D) to the changed positions of the pencil of light.

Figure 2:
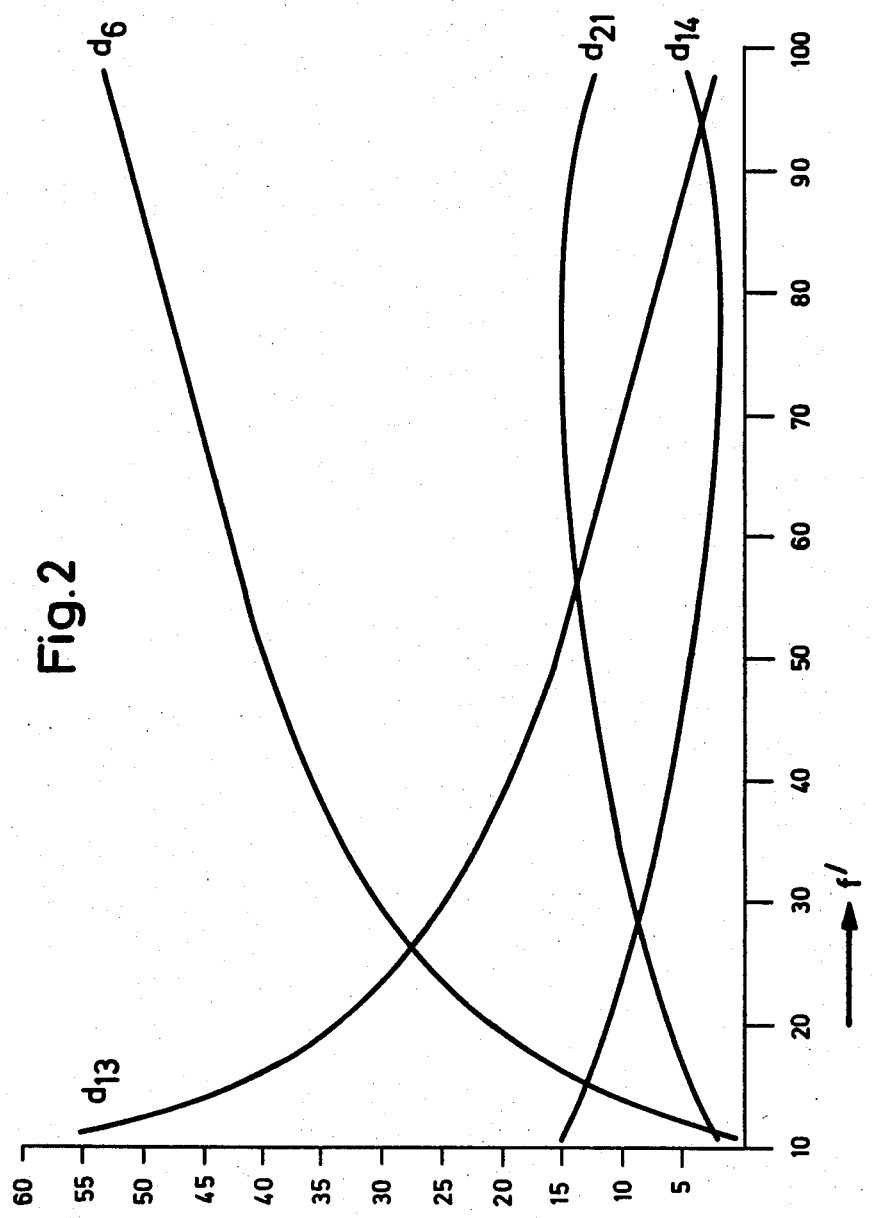
FIG. 2 is a graph of the variable air spaces of this lens as a function of the focal length.

In FIG. 2, the variable air spaces $d_6$, $d_{13}$, $d_{14}$, and $d_{21}$ are plotted as a function of the focal lengths to which the objective may be adjusted. The focal lengths of the lens system are plotted on the horizontal or abscissa axis, and the lengths of the respective variable air spaces on the vertical or ordinate axis, the scales along both axes being in millimeters.

The values given below for the variable air spaces $d_6$, $d_{13}$, $d_{14}$, and $d_{21}$ refer to the different positions of the corresponding members for three different focal length positions of the lens members.

TABLE 2

| | $d_6$ | $d_{13}$ | $d_{14}$ | $d_{21}$ |
|---|---|---|---|---|
| f1 = 10.304 | 0.5 | 55.797 | 15.245 | 2.528 |
| f2 = 49.855 | 40.523 | 15.774 | 4.749 | 13.024 |
| f3 = 97.582 | 53.897 | 2.400 | 4.829 | 12.944 |

It will be noted that in Table 1, these same alternative figures are given for the lengths of each of the four air spaces $d_6$, $d_{13}$, $d_{14}$, and $d_{21}$ which are varied when adjusting the system to a different focal length. In Table 1, as in Table 2, the top figure given for each air space is the value when the system is adjusted to a focal length of 10.304 mm., at or close to the minimum focal length for which the system is designed; the bottom figure for each space is the value when the system is adjusted to a focal length of 97.582 mm., at or close to the maximum focal length for which the system is designed; and the second or intermediate figure for each variable space is the value when the system is adjusted to a typical intermediate focal length of about 50 mm., i.e. specifically a focal length of 49.855 mm.

The focal lengths of the individual lens groups are: fA (i.e., focal length of group A)= +93.603; fB= −19.527; fC= +30.815; fD= +77.282. The focal lengths of the two parts of the fourth lens group D are: fD$_1$= −39.850; fD$_2$= +40.545.

Some variations are possible without departing from the invention. Using the specific example data in Table 1 as a guide, and keeping the variations from the specific data within the limits above stated for the four characteristic features listed as rules to be followed, a skilled lens designer should be able to design various specific lens systems having approximately the same advantages and giving approximately the same beneficial results as a lens system constructed according to the specific example. When making changes from the specific data given in Table 1, it is advisable to adapt the manufacturing data to the indicated data to such an extent that none of the surface powers (Δn/r) differs in amount by more than 0.05·1/fA from the values contained in each case in the data table, fA being the focal length of the converging first lens groups A.

What is claimed is:

1. A photographic lens of continuously variable focal length consisting of four lens groups comprising, in sequence from front to rear along an optical axis:
   (a) a first group (A) of converging refractive power;
   (b) a second group (B) of diverging refractive power;
   (c) a third group (C) of converging refractive power; and
   (d) a fourth group (D) of converging refractive power;
   (e) said lens groups being so dimensioned and arranged that a change in the focal length is effected by displacing diverging lens group B and converging lens group C along the optical axis relative to each other and relative to groups A and D while maintaining a constant back focus;
   said lens being characterized by the features that:
   (f) an iris diaphragm (BL) is located between group B and group C;
   (g) the third lens group C has a focal length which is numerically greater than the focal length of lens group B by a factor not less than 1.42 and not more than 1.73;
   (h) the fourth less group D is formed of two parts (D$_1$ and D$_2$) separated from each other by a clear air space;
   (i) the first part D$_1$ of the fourth lens group is of negative power;
   (j) the second part D$_2$ of the fourth group is of positive power;
   (k) said first part D$_1$ comprises a compound member formed of at least two elements; and
   (l) the focal length of said first part D$_1$ is numerically greater than the focal length of the third lens group C by a factor not less than 1.16 and not more than 1.42;
the respective elements of the lens being dimensioned substantially in accordance with the data in the following table, the respective symbols in the table having the meanings explained in the accompanying specification:

| Lens element | Radii | Thicknesses and Spacings | n$_d$ | V$_d$ |
|---|---|---|---|---|
| I | r$_1$ + 421.790 | | | |
| | | d$_1$    3.0 | 1.75520 | 27.58 |
| | r$_2$ + 64.470 | | | |

-continued

| Lens element | Radii | Thicknesses and Spacings | n$_d$ | V$_d$ |
|---|---|---|---|---|
| | | d$_2$    1.8 | | |
| | r$_3$ + 69.282 | | | |
| II | | d$_3$    10.5 | 1.69100 | 54.71 |
| | r$_4$ − 453.140 | | | |
| | | d$_4$    0.1 | | |
| | r$_5$ + 64.470 | | | |
| III | | d$_5$    7.0 | 1.69100 | 54.71 |
| | r$_6$ + 339.850 | | | |
| | | d$_6$ { 0.5 / 40.523 / 53.897 } | | |
| | r$_7$ + 113.824 | | | |
| IV | | d$_7$    1.2 | 1.71300 | 53.83 |
| | r$_8$ + 17.278 | | | |
| V | | d$_8$    8.0 | 1.71300 | 53.83 |
| | r$_9$ − 48.000 | | | |
| | | d$_9$    1.0 | | |
| | r$_{10}$ + 25.664 | | | |
| VI | | d$_{10}$    3.2 | 1.75520 | 27.58 |
| | r$_{11}$ + 69.282 | | | |
| | | d$_{11}$    2.0 | | |
| | r$_{12}$ + 37.585 | | | |
| VII | | d$_{12}$    3.0 | 1.75520 | 27.58 |
| | r$_{13}$ + 79.431 | | | |
| | | d$_{13}$ { 55.797 / 15.774 / 2.400 } | | |
| BL | r$_{14}$    ∞ | iris diaphragm | | |
| | | d$_{14}$ { 15.245 / 4.749 / 4.829 } | | |
| | r$_{15}$ + 1122.000 | | | |
| VIII | | d$_{15}$    2.0 | 1.805518 | 25.43 |
| | r$_{16}$ + 32.545 | | | |
| IX | | d$_{16}$    8.0 | 1.61272 | 58.63 |
| | r$_{17}$ − 57.460 | | | |
| | | d$_{17}$    0.1 | | |
| | r$_{18}$ + 99.283 | | | |
| X | | d$_{18}$    4.2 | 1.71300 | 53.83 |
| | r$_{19}$ − 172.776 | | | |
| | | d$_{19}$    0.1 | | |
| | r$_{20}$ + 127.721 | | | |
| XI | | d$_{20}$    4.4 | 1.71300 | 53.83 |
| | r$_{21}$ − 68.293 | | | |
| | | d$_{21}$ { 2.528 / 13.024 / 12.944 } | | |
| | r$_{22}$ − 29.853 | | | |
| XII | | d$_{22}$    1.0 | 1.71300 | 53.83 |
| | r$_{23}$ + 20.834 | | | |
| XIII | | d$_{23}$    4.5 | 1.76180 | 26.95 |
| | r$_{24}$ + 227.110 | | | |
| | | d$_{24}$    10.7 | | |
| | r$_{25}$ − 1729.000 | | | |
| XIV | | d$_{25}$    3.2 | 1.69100 | 54.71 |
| | r$_{26}$ − 35.737 | | | |
| | | d$_{26}$    4.1 | | |
| | r$_{27}$ + 112.204 | | | |
| XV | | d$_{27}$    2.2 | 1.80518 | 25.43 |
| | r$_{28}$ + 32.315 | | | |
| | | d$_{28}$    2.7 | | |
| | r$_{29}$ + 82.939 | | | |
| XVI | | d$_{29}$    3.3 | 1.46450 | 65.77 |
| | r$_{30}$ − 35.228 | | | |
| | | d$_{30}$    0.1 | | |
| | r$_{31}$ + 97.166 | | | |
| XVII | | d$_{31}$    4.1 | 1.60311 | 60.60 |
| | r$_{32}$ − 22.386 | | | |
| XVIII | | d$_{32}$    1.5 | 1.80518 | 25.43 |
| | r$_{33}$ − 92.387 | | | |
| | Back focus s' = 28.53 | | | |

2. A photographic lens of continuously variable focal length consisting of four lens groups comprising, in sequence from front to rear along an optical axis:
   (a) a first group (A) of converging refractive power;
   (b) a second group (B) of diverging refractive power;

(c) a third group (C) of converging refractive power; and (d) a fourth group (D) of converging refractive power;

(e) said lens group being so dimensioned and arranged that a change in the focal length is effected by displacing diverging lens group B and converging lens group C along the optical axis relative to each other and relative to groups A and D while maintaining a constant back focus;

said lens being characterized by the features that:

(f) an iris diaphragm (BL) is located between group B and group C;

(g) the third lens group C has a focal length which is numerically greater than the focal length of lens group B by a factor not less than 1.42 and not more than 1.73;

(h) the fourth lens group D is formed of two parts ($D_1$ and $D_2$) separated from each other by a clear air space;

(i) the first part $D_1$ of the fourth lens group is of negative power;

(j) the second part $D_2$ of the fourth lens group is of positive power;

(k) said first part $D_1$ comprises a compound member formed of at least two elements; and (l) the focal length of said first part $D_1$ is numerically greater than the focal length of the third lens group C by a factor not less than 1.16 and not more than 1.42;

the respective elements of the lens being so dimensioned that one of the refractive powers $\Delta n/r$ of the lens differs by more than 0.05 times $1/f_A$ from the corresponding refractive power of a lens dimensioned in accordance with the data in the following table, $f_A$ being the focal length of the converging first lens group A, and the respective symbols in the table having the meanings explained in the accompanying specification:

| Lens element | Radii | | Thicknesses and Spacings | $n_d$ | $V_d$ |
|---|---|---|---|---|---|
| I | $r_1 + 421.790$ | $d_1$ | 3.0 | 1.75520 | 27.58 |
|  | $r_2 + 64.470$ | $d_2$ | 1.8 |  |  |
| II | $r_3 + 69.282$ | $d_3$ | 10.5 | 1.69100 | 54.71 |
|  | $r_4 - 453.140$ | $d_4$ | 0.1 |  |  |
| III | $r_5 + 64.470$ | $d_5$ | 7.0 | 1.69100 | 54.71 |
|  | $r_6 + 339.850$ |  | 0.5 |  |  |
|  |  | $d_6$ | 40.523 / 53.897 |  |  |
| IV | $r_7 + 113.824$ | $d_7$ | 1.2 | 1.71300 | 53.83 |
| V | $r_8 + 17.278$ | $d_8$ | 8.0 | 1.71300 | 53.83 |
|  | $r_9 - 48.000$ | $d_9$ | 1.0 |  |  |
| VI | $r_{10} + 25.664$ | $d_{10}$ | 3.2 | 1.75520 | 27.58 |
|  | $r_{11} + 69.282$ | $d_{11}$ | 2.0 |  |  |
| VII | $r_{12} + 37.585$ | $d_{12}$ | 3.0 | 1.75520 | 27.58 |
|  | $r_{13} + 79.431$ | $d_{13}$ | 55.797 / 15.774 / 2.400 |  |  |
| BL | $r_{14}\ \infty$ |  | iris diaphragm |  |  |
|  |  | $d_{14}$ | 15.245 / 4.749 / 4.829 |  |  |
| VIII | $r_{15} + 1122.000$ | $d_{15}$ | 2.0 | 1.805518 | 25.43 |
|  | $r_{16} + 32.545$ | $d_{16}$ | 8.0 | 1.61272 | 58.63 |
| IX | $r_{17} - 57.460$ | $d_{17}$ | 0.1 |  |  |
|  | $r_{18} + 99.283$ | $d_{18}$ | 4.2 | 1.71300 | 53.83 |
| X | $r_{19} - 172.776$ | $d_{19}$ | 0.1 |  |  |
|  | $r_{20} + 127.721$ | $d_{20}$ | 4.4 | 1.71300 | 53.83 |
| XI | $r_{21} - 68.293$ | $d_{21}$ | 2.528 / 13.024 / 12.944 |  |  |
| XII | $r_{22} - 29.853$ | $d_{22}$ | 1.0 | 1.71300 | 53.83 |
| XIII | $r_{23} + 20.834$ | $d_{23}$ | 4.5 | 1.76180 | 26.95 |
|  | $r_{24} + 227.110$ | $d_{24}$ | 10.7 |  |  |
| XIV | $r_{25} - 1729.000$ | $d_{25}$ | 3.2 | 1.69100 | 54.71 |
|  | $r_{26} - 35.737$ | $d_{26}$ | 4.1 |  |  |
| XV | $r_{27} + 112.204$ | $d_{27}$ | 2.2 | 1.80518 | 25.43 |
|  | $r_{28} + 32.315$ | $d_{28}$ | 2.7 |  |  |
| XVI | $r_{29} + 82.939$ | $d_{29}$ | 3.3 | 1.46450 | 65.77 |
|  | $r_{30} - 35.228$ | $d_{30}$ | 0.1 |  |  |
| XVII | $r_{31} + 97.166$ | $d_{31}$ | 4.1 | 1.60311 | 60.60 |
|  | $r_{32} - 22.386$ |  |  |  |  |
| XVIII |  | $d_{32}$ | 1.5 | 1.80518 | 25.43 |
|  | $r_{33} - 92.387$ |  |  |  |  |
| Back focus $s' = 28.53$ | | | | | |

\* \* \* \* \*